Figure 1B:
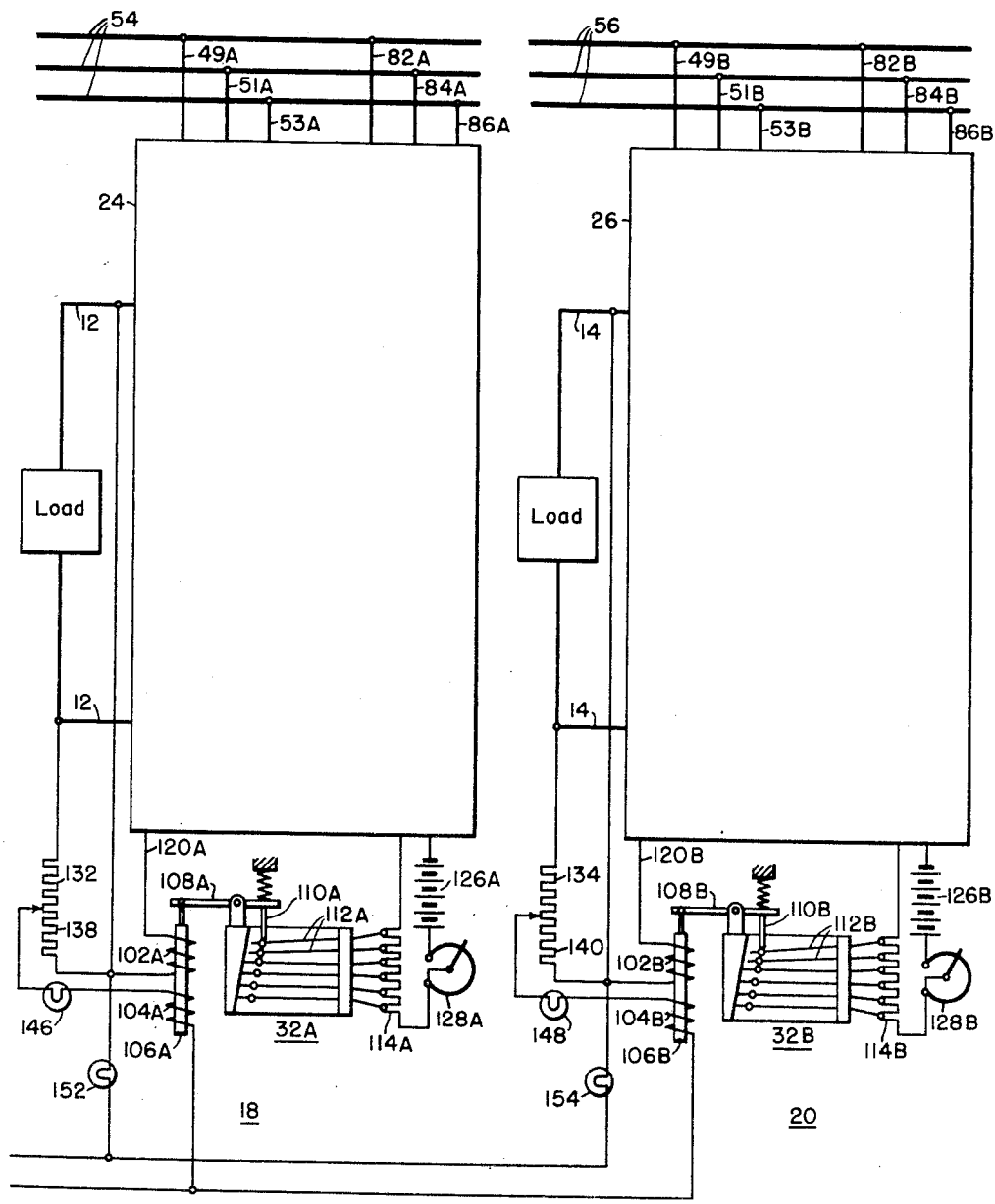

Jan. 18, 1955 R. A. GEISELMAN ET AL 2,700,113
CONTROL APPARATUS
Filed Oct. 15, 1953 2 Sheets-Sheet 1
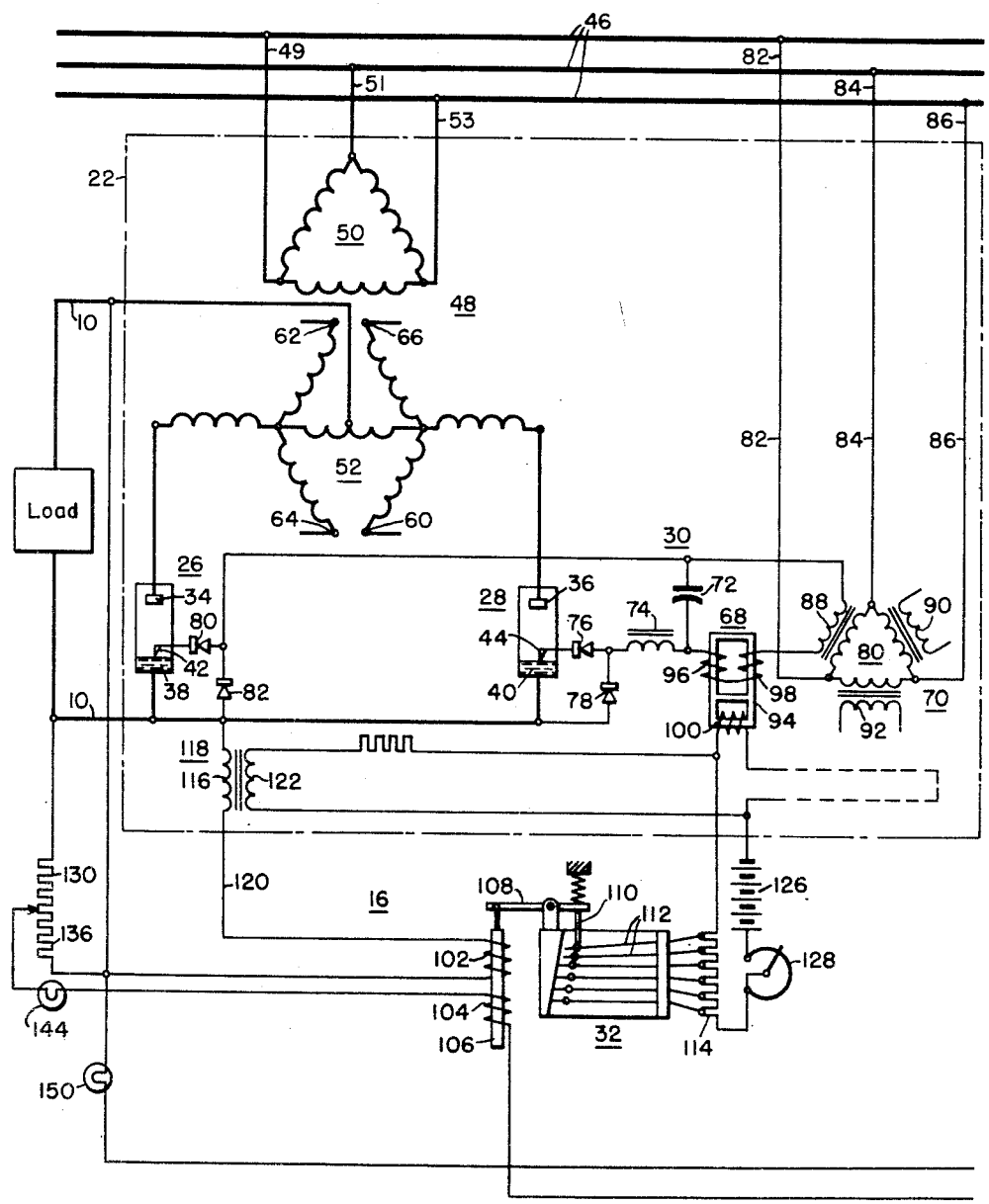
Fig. IA.
WITNESSES
INVENTORS
Ralph A. Geiselman &
Edward J. Cham.
BY
ATTORNEY

United States Patent Office 2,700,113
Patented Jan. 18, 1955

2,700,113

CONTROL APPARATUS

Ralph A. Geiselman, Pittsburgh, and Edward J. Cham, Irwin, Pa., assignors to Westinghouse Electric Corporation, East Pittsburgh, Pa., a corporation of Pennsylvania Application October 15, 1953, Serial No. 386,364

9 Claims. (Cl. 307—58)

This invention relates to electrical control apparatus and more particularly to regulating apparatus for maintaining a predetermined relationship between the magnitudes of the voltages across a plurality of separate buses.

In many applications it is necessary to maintain a predetermined relationship between the magnitudes of the voltages across a plurality of separate buses. For instance, in steel mill rolling apparatus it is necessary to maintain the input voltages to a plurality of gear motors substantially equal. These gear motors drive the rolls through which strips of steel are passed and thus if unequal voltages were applied to the inputs of the gear motors the strips of steel would be subjected to buckling or high tensile forces. Normally a separate regulator is provided for each of the gear motors so as to maintain the input voltage to the gear motors substantially constant. However, if one or more of the regulators associated with the gear motors is unable, owing to its regulating limits, to increase the input voltage to its respective gear motor so as to maintain the input voltages to the gear motors substantially equal, the steel strip will buckle or have large tensile forces applied thereto.

If the regulating characteristics of each of the regulators associated with the above-mentioned gear motors are not sufficiently close, the various regulators will likewise not maintain equal voltage inputs to their associated gear motors. In practice, the difference in the regulating characteristics of the various regulators might be due to, for instance, the manufacturing of slightly different characteristics for each of the regulators.

A further problem is presented when each of the regulators receive alternating-current energy from separate sources and thus, if the output voltages of the separate sources are not substantially equal many regulators will not produce output voltages which are of equal magnitude.

An object of this invention is to provide for maintaining a predetermined relationship between the magnitudes of the voltages across a plurality of separate buses.

Another object of this invention is to provide for maintaining a predetermined relationship between the magnitudes of the voltages across a plurality of buses even though the regulation limits of one or more of the regulators associated with the plurality of buses has been exceeded, by so interconnecting the compensating coils of each of the regulators with one another and with the plurality of buses that each of the compensating coils is responsive to some measure of the difference in the magnitudes of the voltages across the plurality of buses and applies a correcting action of the proper sense to its respective regulator to thereby maintain the predetermined relationship between the magnitudes of the voltages across the respective buses.

A further object of this invention is to provide for maintaining a predetermined relationship between the magnitudes of the voltages across a plurality of separate buses without decreasing the sensitivity or speed of response of the regulators associated with the plurality of buses, by so interconnecting the compensating coils of each of the regulators with one another and with the plurality of buses that each of the compensating coils is responsive to some measure of the difference of the voltages across the plurality of buses and applies a correcting action of the proper sense to its regulator to thereby maintain the predetermined relationship between the magnitudes of the voltages across the respective buses, and by maintaining a minimum of impedance in the circuits interconnecting the compensating coils so that the sensitivity and speed of response of their associated regulators is not decreased.

A still further object of this invention is to provide for preventing damage to the compensating coils of the regulators connected to the separate buses without decreasing the sensitivity of speed of response of the regulators, by exponentially increasing the impedance of the circuits interconnecting the compensating coils in accordance with the difference in the magnitudes of the voltages across the separate buses.

Still another object of this invention is to provide for maintaining a predetermined relationship between the magnitudes of the voltages across a plurality of separate buses even though the regulating characteristics of the respective regulators associated with each of the separate buses are not identical.

A still further object of this invention is to provide for maintaining a predetermined relationship between the magnitudes of the voltages across a plurality of separate buses even though the respective regulators associated with each of the separate buses receive energy from separate sources.

Other objects of this invention will become apparent from the following description when taken in conjunction with the accompanying drawings in which:

Figures 1A and 1B when combined illustrate apparatus and circuits embodying the teachings of this invention.

Referring to Figs. 1A and 1B, there is illustrated control apparatus for maintaining a predetermined relationship between the magnitudes of the direct-current voltages across a plurality of buses 10, 12 and 14. That is, the control apparatus illustrated can either maintain the magnitudes of the voltages across the buses 10, 12 and 14 substantially equal or it can maintain a given relationship between the magnitudes of the voltages across the buses 10, 12 and 14, as will be explained more fully hereinafter. In the embodiment illustrated, the control apparatus comprises three regulators 16, 18 and 20 for maintaining the magnitudes of the direct-current voltages across their respective buses 10, 12 and 14 substantially constant. Since the regulators 16, 18 and 20 comprise similar components and interconnecting circuits, only the regulator 16 illustrated in Fig. 1A will be described in detail. The corresponding components of the regulators 18 and 20 have been given the same reference characters except that in the case of the regulator 18 the reference characters have a suffix A and in the case of the regulator 20 the reference characters have a suffix B. Further in order to simplify the drawings that portion of the regulator 16 disposed within the enclosure 22 has not been redrawn in the case of the regulators 18 and 20, it being understood that the portions of the regulators 18 and 20 contained within the enclosures 24 and 26, respectively, correspond to that portion of the regulator 16 within the enclosure 22.

In general, the regulator 16 comprises a plurality of ignitron rectifiers 26 and 28 which are interconnected with the bus 10 in order to effect a direct-current voltage across the bus 10, an ignitor pulse phase-shifter circuit 30 for alternately supplying an ignitor pulse to the ignitron rectifiers 26 and 28, and a signal responsive variable impedance 32 responsive to the magnitude of the voltage across the bus 10 to control the operation of the phase-shifter circuit 30 in accordance with the magnitude of the voltage across the bus 10.

As illustrated, the ignitron rectifiers 26 and 28 comprise anodes 34 and 36, respectively, mercury pool cathodes 38 and 40, respectively and ignitors 42 and 44, respectively. In operation, the ignitron rectifiers 26 and 28 receive their anode voltage from a suitable source of alternating-current energy 46. In particular, a three-phase transformer 48 having a primary winding 50 and a secondary winding 52 is interconnected between the alternating-current source 46 and the ignitron rectifiers 26 and 28, the primary winding 50 being connected to the alternating-current source 46 by means of conductors 49, 51 and 53.

In the embodiment illustrated, the regulators 18 and 20 receive alternating-current energy from separate alternating-current sources 54 and 56, respectively. However, it is to be understood that a common alternating-current source (not shown) could be utilized for supplying alternating-current energy to the regulators 16, 18 and 20. But, if in practice only separate sources of alternating-current energy, such as the sources 46, 54 and 56, are available, the control apparatus illustrated in Figs. 1A and 1B still maintains a predetermined relationship between the magnitudes of the voltages across the buses 10, 12 and 14.

For the purpose of simplifying the drawings and the description of the control apparatus only one phase of the rectifier comprising the ignitron rectifiers 26 and 28 is illustrated, it being understood that a pair of alternately conducting ignitron rectifiers (not shown) is interconnected with the phase terminals 60 and 62 and that a pair of alternately conducting ignitron rectifiers (not shown) is interconnected with the phase terminals 64 and 66 of the transformer 48. These interconnections (not shown) for producing a three-phase rectifier (not shown) will be described more fully hereinafter.

Referring more particularly to the phase-shifter circuit 30, this circuit alternately supplies a peaked ignitor pulse to the ignitron rectifiers 26 and 28. In this instance, the phase-shifter circuit 30 comprises a saturable reactor 68, a three-phase transformer 70, a capacitor 72, a linear saturable reactor 74 and rectifiers 76, 78, 80 and 82. In particular, the transformer 70 comprises a primary winding 80, which is connected to the alternating-current source 46 by means of conductors 82, 84 and 86, and secondary winding sections 88, 90 and 92. As hereinbefore mentioned, the regulator 16 also comprises two other pairs of ignitron rectifiers (not shown) corresponding to the pair of ignitron rectifiers 26 and 28. A phase-shifter circuit (not shown) corresponding to the phase-shifter circuit 30 is interconnected between one of these pairs of ignitron rectifiers (not shown) and the secondary winding section 90 of the transformer 70. A phase-shifter circuit (not shown) corresponding to the phase-shifter circuit 30 is also interconnected between the other pair of ignitron rectifiers (not shown) and the secondary winding section 92 of the transformer 70 so as to produce a six-phase ignitron rectifier for the regulator 16, the two phase-shifter circuits (not shown) also being controlled by the variable impedance 32.

The saturable reactor 68 is provided in order to control the rate at which the capacitor 72 charges up, and thus the phase relationship between the ignitor pulses, supplied to the ignitron rectifiers 26 and 28, and their respective anode voltages. In this instance, the saturable reactor 68 comprises a magnetic core member 94 having disposed in inductive relationship therewith load windings 96 and 98 and a control winding 100. As illustrated, the load windings 96 and 98 of the saturable reactor 68 are connected in series circuit relationship with one another and with the capacitor 72 and with the secondary winding section 88 of the transformer 70. Thus, the capacitor 72 receives energy from the secondary winding section 88 of the transformer 70 and, as will be explained more fully hereinafter, the saturable reactor 68 controls the rate at which the capacitor 72 charges up.

In order to peak the pulse as received from the capacitor 72 as it discharges, the linear saturable reactor 74 is provided. On the other hand, for the purpose of alternately supplying an ignitor pulse to the ignitron rectifiers 26 and 28, the rectifiers 76, 78, 80 and 82 are interconnected with the ignitor 44 and the cathode 40 of the rectifier 28 and with the ignitor 42 and the cathode 38 of the rectifier 26.

As hereinbefore mentioned, the signal responsive variable impedance 32 controls the operation of the phase-shifter circuit 30. In this instance, the signal responsive variable impedance 32 comprises a main coil 102 responsive to the magnitude of the voltage across the bus 10, a compensating coil 104, an armature 106, a mechanical linkage 108, an actuating member 110, a plurality of electrically conducting leaf members 112, and a resistor 114. In order to prevent oscillations in the regulator 16, the secondary winding 116 of a damping transformer 118, is connected in circuit relationship with the main coil 102 of the variable impedance 32. In particular, the secondary winding 116 is connected in series circuit relationship with the main coil 102 by means of a conductor 120, the series circuit being connected across the bus 10. On the other hand, the primary winding 122 of the damping transformer 118 is connected across the control winding 100 of the saturable reactor 68 so that the damping transformer 118 is responsive to the rate of change of voltage across the control winding 100. Thus, the damping transformer 118 produces across its secondary winding 116 a voltage which opposes an increase in the voltage across the main coil 102 of the variable impedance 32.

In order to supply direct-current energy to the control winding 100 of the saturable reactor 68 a battery 126 is connected in circuit relationship with the resistor 114 of the variable impedance 32. Also connected in circuit relationship with the resistor 114 and the battery 126 is a rheostat 128 which is provided in order to vary the magnitude of the regulated voltage appearing across the bus 10.

In accordance with the teachings of this invention in order to maintain a predetermined relationship between the magnitudes of the voltages across the buses 10, 12 and 14 a compensating circuit is associated with each of the regulators 16, 18 and 20. Broadly, each of the compensating circuits of the regulators 16, 18 and 20 is connected to be responsive to a measure of the magnitude of the voltage across its respective bus 10, 12 or 14 and includes its respective compensating coil 104, 104A or 104B. In order to effect a proper correcting action on the respective regulators 16, 18 and 20, the hereinbefore mentioned compensating circuits of the regulators 16, 18 and 20 are connected in parallel circuit relationship with one another with the result that the potentials applied to each of the compensating circuits are in opposition to one another.

As illustrated, variable resistors 130, 132 and 134 are connected across their respective buses 10, 12 and 14 in order that voltages proportional to the magnitudes of the voltages across the associated separate buses 10, 12 and 14, respectively, appear across predetermined portions 136, 138 and 140 of the resistors 130, 132 and 134, respectively. Specifically, the compensating circuit associated with the regulator 16 comprises a series circuit including the predetermined portion 136 of the resistor 130, a lamp 144 having a positive temperature coefficient of resistance, and the compensating coil 104 of the signal responsive variable impedance 32. On the other hand, the compensating circuit associated with the regulator 18 comprises a series circuit including the predetermined portion 138 of the resistor 132, a lamp 146 having a positive temperature coefficient of resistance and the compensating coil 104A of the signal responsive variable impedance 32A. In like manner, the compensating circuit associated with the regulator 20 comprises a series circuit including the predetermined portion 140 of the resistor 134, a lamp 148 having a positive temperature coefficient of resistance, and the compensating coil 104B of the signal responsive variable impedance 32B. In accordance with the teachings of this invention the compensating circuits associated with the regulators 16, 18 and 20 are connected in parallel circuit relationship with one another with the polarity of the voltages across the predetermined portions 136, 138 and 140 in opposition to one another so that, as will be explained more fully hereinafter, each of the compensating coils 104, 104A and 104B of the regulators 16, 18 and 20, respectively, can effect a proper correcting action with respect to its associated regulator.

It is to be noted that by so interconnecting the lamps 144, 146 and 148 the speed of response and sensitivity of the regulators 16, 18 and 20 is not decreased and yet an excessive current flow through the compensating circuits associated with the regulators 16, 18 and 20 is prevented. Thus, by providing the lamps 144, 146 and 148, the impedances of the compensating circuits associated with the regulators 16, 18 and 20 are increased exponentially as the voltages across the buses 10, 12 and 14 deviate further from their predetermined relationship, as will be explained more fully hereinafter.

If the magnitude of the difference voltage appearing across the lamps 144, 146 and 148 should become sufficiently great, the lamps 144, 146 and 148 may be damaged to thereby possibly render the compensating apparatus inoperative. However, in order to distribute the difference voltages appearing in the compensating circuits associated with the regulators 16, 18 and 20, lamps 150, 152 and 154 having a positive temperature coefficient of resistance may also be included in these compensating circuits. In particular, as illustrated the lamp 150 is included in the compensating circuit associated with the regulator 16 and the lamp 152 is connected in the compensating circuit associated with the regulator 18. On the other hand, the lamp 154 is included in the compensating circuit associated with the regulator 20.

The operation of the regulator 16 in maintaining the magnitude of the voltage across the bus 10 substantially constant will now be described. Since the regulators 18 and 20 function in substantially the same manner as the regulator 16 in maintaining the magnitude of the voltages across the buses 12 and 14, respectively, substantially constant, a description of the operation of the regulators 18 and 20 in maintaining the magnitudes of the voltages across the buses 12 and 14, respectively, substantially constant is deemed unnecessary.

Assuming the voltage across the bus 10 increases to a value above its regulated value, then the current flow through the main coil 102 of the variable impedance 32 increases to thereby effect an actuation of the armature 106 in such a direction as to increase the amount of the resistor 114 that is connected in circuit relationship with the control winding 100 of the saturable reactor 68. With an increase in the amount of the resistor 114 connected in circuit relationship with the control winding 100, the current flow through the control winding 100 of the saturable reactor 68 decreases to thereby increase the impedance of the load windings 96 and 98 of the saturable reactor 68. An increase in the impedance of the load windings 96 and 98 decreases the rate at which the capacitor 72 charges up. Therefore, the firing angle between the ignitor pulses supplied to the ignitron rectifiers 26 and 28 and the respective anode voltages increases to thereby decrease the voltage across the bus 10 to the regulated value.

The manner in which the ignitor pulses are alternately supplied to the ignitron rectifiers 26 and 28 is as follows. When the upper end of the secondary winding section 88 of the transformer 70, as illustrated, is at a positive polarity with respect to the lower end of the winding section 88 the capacitor 72 is charged up in such a direction that its upper end, as illustrated is at a positive potential with respect to its lower end. The potential across the capacitor 72 when charged up in such a direction increases in magnitude until it overcomes the impedance offered by the rectifier 80, the ignitor 42 of the rectifier 26, the cathode 38, the rectifier 78, and the linear saturable reactor 74, to thereby produce a cathode spot for the ignitron rectifier 26. Current then flows from one end of the capacitor 72 through the rectifier 80, the ignitor 42 of the rectifier 26, the cathode 38, the rectifier 78, and the linear saturable reactor 74, to the other end of the capacitor 72.

On the other hand, when the lower end of the secondary winding section 88 of the transformer 70, as illustrated, is at a positive potential with respect to the upper end of the section 88 the capacitor 72 charges up in the opposite direction. The capacitor 72 continues to charge up in this direction until the potential across the capacitor 72 is of sufficient magnitude to overcome the impedance offered by the linear saturable reactor 74, the rectifier 76, the ignitor 44 of the rectifier 28, the cathode 40, and the rectifier 82, to thereby effect a cathode spot for the ignitron rectifier 28. When the rectifier 28 fires current flows from one end of the capacitor 72 through the linear saturable reactor 74, the rectifier 76, the ignitor 44, the cathode 40 of the rectifier 28, and the rectifier 82, to the other end of the capacitor 72.

Assuming the voltage across the bus 10 decreases to a value below the regulated value, then the armature 106 of the variable impedance 32 is actuated in such a direction as to decrease the amount of the resistor 114 connected in circuit relationship with the control winding 100 of the saturable reactor 68. A decrease in the amount of the resistor 114 connected in circuit relationship with control winding 100 increases the magnitude of the current flow therethrough to thereby decrease the impedance of the load windings 96 and 98 of the saturable reactor 68. A decrease in the impedance of the load windings 96 and 98 increases the rate at which the capacitor 72 charges up in both directions and thus decreases the firing angle between the ignitor pulses supplied to the rectifiers 26 and 28 and the respective anode voltages as applied to these rectifiers. With a decrease in the firing angle between the ignitor pulses and the respective anode voltages of the rectifiers 26 and 28 the magnitude of the voltage across the bus 10 is returned to its regulated value.

The manner in which the compensating circuits associated with the regulators 16, 18 and 20 maintain a predetermined relationship between the magnitudes of the voltages across the buses 10, 12 and 14 will now be described. However, before putting the apparatus illustrated in Figs. 1A and 1B into operation, the variable resistors 130, 132 and 134 are adjusted so that the magnitudes of the voltages across the predetermined portions 136, 138 and 140 of the resistors 130, 132 and 134, respectively, are substantially equal. With the variable resistors 130, 132 and 134 so adjusted and assuming the voltages across the buses 12 and 14 decrease to a predetermined value so that the predetermined relationship between the voltages across the buses 10, 12 and 14 no longer exists. Under such a condition the voltage appearing across the predetermined portions 138 an 140 of the resistors 132 and 134, respectively, are of smaller magnitude than when the predetermined relationship between the voltages across the buses 10, 12 and 14 existed. Let us assume that the voltages across the predetermined portions 138 and 140 decrease to 90 volts and that the voltage across the predetermined portion 136 of the resistor 130 remains at its preselected value of 100 volts. Under such conditions, current flows from one end of the predetermined portion 136 of the resistor 130 through the lamp 144, the compensating coil 104 of the variable impedance 32, and the parallel circuit, one branch of which includes the compensating coil 104A of the variable impedance 32A, the lamp 146, the predetermined portion 138 of the resistor 132, and the lamp 152 and the other branch of which comprises the compensating coil 104B of the variable impedance 32B, the lamp 148, the predetermined portion 140 of the resistor 134, and the lamp 154, to the other end of the predetermined portion 136 of the resistor 130 by passing through the lamp 150.

Further, under such conditions, when the magnitude of the voltage across the predetermined portion 136 of the resistor 130 is of greater magnitude than the voltages across the predetermined portions 138, 140 of the resistors 132 and 134 respectively, the current flow through the compensating coil 104 is in such a direction as to increase the amount of the resistor 114 connected in circuit relationship with the control winding 100 of the saturable reactor 68. With an increase in the amount of the resistor 114 connected in circuit relationship with the control winding 100, the current flow through the control winding 100 decreases to thereby, as hereinbefore explained, decrease the magnitude of the voltage across the bus 10.

However, with the magnitude of the voltages across the predetermined portions 138 and 140 of the resistors 132 and 134, respectively, of less magnitude than the voltage across the predetermined portion 136 of the resistor 130, the current flow through the compensating coil 104A of the variable impedance 32A is in such a direction as to decrease the amount of the resistor 114A connected in circuit relationship with its associated control winding (not shown) to thereby increase the magnitude of the voltage across the bus 12. Under the above assumed conditions, the current flow through the compensating coil 104B of the variable impedance 32B is in such a direction as to likewise decrease the amount of the resistor 114B connected in circuit relationship with its associated control winding (not shown), to thus also increase the magnitude of the voltage across the bus 14.

It is to be noted that under these assumed conditions of the magnitudes of the voltages across the predetermined portions 136, 138 and 140 of the resistors 130, 132 and 134, respectively, the magnitude of the current flow through the compensating coil 104 of the variable impedance 32 is approximately twice the magnitude of the current flowing through the compensating coils 104A and 104B of the variable impedances 32A and 32B, respectively. Thus, by providing the compensating circuits associated with the regulators 16, 18 and 20 and so interconnecting them as hereinbefore described, a predetermined relationship is maintained between the magnitudes of the voltages across the buses 10, 12 and 14 even though one or more of the regulators 16, 18 can not further increase the magnitude of its output voltage across its respective bus owing to the fact that it has reached the end of its regulating limit or even though the regulating characteristics of the regulators 16, 18 and 20 are not substantially the same. For instance, the regulator 16 will reach the end of its regulator limit when the saturable reactor 68 becomes substantially completely saturated and can thus effect no future change in the firing angle between the ignitor voltages and anode voltages of the ignitron rectifiers 26 and 28.

In operation, if for instance the magnitude of the voltages across the predetermined portions 136 and 140 of the resistors 130 and 134, respectively, decreases and the magnitude of the voltage across the predetermined portion 138 of the resistor 132 remains unchanged then current flows through the compensating coils 104, 104A and 104B of the regulators 16, 18 and 20, respectively in such a direction as to increase the magnitude of the voltages across the buses 10 and 14 and to decrease to approximately twice the extent the voltage across the bus 12, and thus reestablish the predetermined relationship between the magnitudes of the voltages across the buses 10, 12 and 14. Thus, whenever an unbalance exists between the magnitudes of the voltages across the predetermined portions 136, 138 and 140, current flows through the compensating coils 104, 104A and 104B to thereby reestablish the predetermined relationship between the magnitudes of the voltages across the buses 10, 12 and 14.

The apparatus embodying the teachings of this invention has several advantages. For instance, the speed of response and sensitivity of the regulators 16, 18 and 20 is not decreased and yet the predetermined relationship between the magnitudes of the voltages across the buses 10, 12 and 14 is continuously maintained. Further, the sensitivity and speed of response of the regulators 16, 18 and 20 is not decreased and yet the apparatus illustrated in Figs. 1A and 1B can be operated without damage to the compensating coils 104, 104A and 104B. In addition, the predetermined relationship between the magnitudes of the voltages across the buses 10, 12 and 14 is maintained even though the magnitude of the voltages across the alternating-current sources 46, 54 and 56 are of different magnitude. This relationship is also maintained when the regulating characteristics of the regulators 16, 18 and 20 are different.

Since certain changes may be made in the above apparatus and circuits and different embodiments of the invention may be made without departing from the scope thereof, it is intended that all matter contained in the above description or shown in the accompanying drawings shall be interpreted as illustrative and not in a limiting sense.

We claim as our invention:

1. In control apparatus for maintaining a predetermined relationship between the magnitudes of the voltages across a plurality of separate buses, the combination comprising, a regulator associated with each of the separate buses for maintaining within limits the magnitude of the voltage across its respective separate bus substantially constant, each regulator comprising a main coil and a compensating coil, the main coil being responsive to a measure of the magnitude of the voltage across its respective separate bus, and a compensating circuit associated with each of the regulators, each of the compensating circuits being connected to be responsive to a measure of the magnitude of the voltage across its respective bus and including the compensating coil of its respective regulator, the compensating circuits being connected in parallel circuit relationship with one another with the result that the potentials applied to the compensating circuits are in opposition to one another, so that each of the compensating coils can effect a correcting action with respect to its regulator, to thus maintain the predetermined relationship between the voltages across the plurality of separate buses.

2. In control apparatus for maintaining a predetermined relationship between the magnitudes of the voltages across a plurality of separate buses, the combination comprising, a regulator associated with each of the separate buses for maintaining within limits the magnitude of the voltage across its respective separate bus substantially constant, each regulator comprising a main coil and a compensating coil, the main coil being responsive to a measure of the magnitude of the voltage across its respective separate bus, and a compensating circuit associated with each of the regulators, each of the compensating circuits including the compensating coil of its respective regulator and a predetermined portion of a resistor across which is applied a voltage the magnitude of which is proportional to the magnitude of the voltage across its associated separate bus, the compensating circuits being connected in parallel circuit relationship with one another with the polarity of the voltages across said predetermined portions of the resistors in opposition to one another, so that each of the compensating coils can effect a correcting action with respect to its regulator, to thus maintain the predetermined relationship between the voltages across the plurality of separate buses.

3. In control apparatus for maintaining a predetermined relationship between the magnitudes of the voltages across at least three separate buses, the combination comprising, a regulator associated with each of the three separate buses for maintaining within limits the magnitude of the voltage across its respective separate bus substantially constant, each regulator comprising a main coil and a compensating coil, the main coil being responsive to a measure of the magnitude of the voltage across its respective separate bus, and a compensating circuit associated with each of the regulators, each of the compensating circuits being connected to be responsive to a measure of the magnitude of the voltage across its respective bus and including the compensating coil of its respective regulator, the compensating circuits being connected in parallel circuit relationship with one another with the result that the potentials applied to the compensating circuits are in opposition to one another, so that each of the compensating coils can effect a correcting action with respect to its regulator, to thus maintain the predetermined relationship between the magnitudes of the voltages across the three separate buses.

4. In control apparatus for maintaining a predetermined relationship between the magnitudes of the voltages across at least three separate buses, the combination comprising, a regulator associated with each of the three separate buses for maintaining within limits the magnitude of the voltage across its respective separate bus substantially constant, each regulator comprising a main coil and a compensating coil, the main coil being responsive to a measure of the magnitude of the voltage across its respective separate bus, and a compensating circuit associated with each of the regulators, each of the compensating circuits including the compensating coil of its respective regulator and a predetermined portion of a resistor across which is applied a voltage the magnitude of which is proportional to the magnitude of the voltage across its associated separate bus, the compensating circuits being connected in parallel circuit relationship with one another with the polarity of the voltages across said predetermined portions of the resistors in opposition to one another, so that each of the compensating coils can effect a correcting action with respect to its regulator, to thus maintain the predetermined relationship between the magnitudes of the voltages across the three separate buses.

5. In control apparatus for maintaining a predetermined relationship between the magnitudes of the voltages across at least three separate buses, the combination comprising, a regulator associated with each of the three separate buses for maintaining within limits the magnitude of the voltage across its respective separate bus substantially constant, each regulator comprising a main coil and a compensating coil, the main coil being responsive to a measure of the magnitude of the voltage across its respective separate bus, and a compensating circuit associated with each of the regulators, each of the compensating circuits including the compensating coil of its respective regulator, a lamp having a positive temperature coefficient of resistance, and a predetermined portion of a resistor across which is applied a voltage the magnitude of which is proportional to the magnitude of the voltage across its associated separate bus, the compensating circuits being connected in parallel circuit relationship with one another with the polarity of the voltages across said predetermined portions of the resistors in opposition to one another, so that each of the compensating coils can effect a correcting action with respect to its regulator, to thus maintain the predetermined relationship between the magnitudes of the voltages across the three separate buses.

6. In control apparatus for maintaining a predetermined relationship between the magnitudes of the voltages across at least three separate buses, the combination comprising, a regulator associated with each of the three separate buses for maintaining within limits the magnitude of the voltage across its respective separate bus substantially constant, each regulator comprising a main coil and a compensating coil, the main coil being responsive to a measure of the magnitude of the voltage across its respective separate bus, and a compensating circuit associated with each of the regulators, each of the compensating circuits comprising a series circuit including the compensating coil of its respective regulator, a lamp having a positive temperature coefficient of resistance, and a predetermined portion of a resistor across which is applied a voltage the magnitude of which is proportional to the magnitude of the voltage across its associated separate bus, the compensating circuits being connected in parallel circuit relationship with one another with the polarity of the voltages across said predetermined portions of the resistors in opposition to one another, so that each of the compensating coils can effect a correcting action with respect to its regulator, to thus maintain the predetermined relationship between the magnitudes of the voltages across the three separate buses.

7. In control apparatus for maintaining a predetermined relationship between the magnitudes of the voltages across a plurality of separate buses, the combination comprising, a regulator associated with each of the separate buses for maintaining within limits the magnitude of the voltage across its respective separate bus substantially constant, each regulator comprising a plurality of ignitron rectifiers each having an anode, a cathode, and an ignitor, the anode and cathode of each of said rectifiers being connected in circuit relationship with its associated separate bus, an ignitor pulse phase-shifter circuit connected to the ignitor and cathode of each of said rectifiers for alternately supplying an ignitor pulse to each of said rectifiers, and a signal responsive variable impedance having a main coil and a compensating coil, the main coil being responsive to a measure of the magnitude of the voltage across its respective separate bus so as to control the operation of the ignitor pulse phase-shifter circuit, and a compensating circuit associated with each of the regulators, each of the compensating circuits being connected to be responsive to a measure of the magnitude of the voltage across its respective bus and including the compensating coil of its respective regulator, the compensating circuits being connected in parallel circuit relationship with one another with the result that the potentials applied to the compensating circuits are in opposition to one another, so that each of the compensating coils can effect a correcting action with respect to its regulator, and thus maintain the predetermined relationship between the voltages across the plurality of separate buses.

8. In control apparatus for maintaining a predetermined relationship between the magnitudes of the voltages across a plurality of separate buses, the combination comprising, a regulator associated with each of the separate buses for maintaining within limits the magnitude of the voltage across its respective separate bus substantially constant, each regulator comprising a plurality of ignitron rectifiers each having an anode, a cathode, and an ignitor, the anode and cathode of each of said rectifiers being connected in circuit relationship with its associated separate bus, an ignitor pulse phase-shifter circuit connected to the ignitor and cathode of each of said rectifiers for alternately supplying an ignitor pulse to each of said rectifiers, and a signal responsive variable impedance having a main coil and a compensating coil, the main coil being responsive to a measure of the magnitude of the voltage across its respective separate bus so as to control the operation of the ignitor pulse phase-shifter circuit, and a compensating circuit associated with each of the regulators, each of the compensating circuits including the compensating coil of its respective regulator and a predetermined portion of a resistor across which is applied a voltage the magnitude of which is proportional to the magnitude of the voltage across its associated separate bus, the compensating circuits being connected in parallel circuit relationship with one another with the polarity of the voltages across said predetermined portions of the resistors in opposition to one another, so that each of the compensating coils can effect a correcting action with respect to its regulator, to thus maintain the predetermined relationship between the voltages across the plurality of separate buses.

9. In control apparatus for maintaining a predetermined relationship between the magnitudes of the voltages across at least three separate buses, the combination comprising, a regulator associated with each of the three separate buses for maintaining within limits the magnitude of the voltage across its respective separate bus substantially constant, each regulator comprising a plurality of ignitron rectifiers, each of said rectifiers having an anode, a cathode, and an ignitor, the anode and cathode of each of said rectifiers being connected in circuit relationship with its associated separate bus, an ignitor pulse phase-shifter circuit connected in circuit relationship with the cathode and ignitor of each of said rectifiers so as to alternately supply an ignitor pulse to each of said rectifiers, and a signal responsive variable impedance including a main coil and a compensating coil, the signal responsive variable impedance being connected in circuit relationship with the ignitor pulse phase-shifter circuit and the main coil of the ignitor pulse phase-shifter circuit being responsive to the magnitude of the voltage across its associated separate bus so as to control the operation of the ignitor pulse phase-shifter circuit in accordance with the magnitude of the voltage across the respective separate bus, and a compensating circuit associated with each of the regulators, each of the compensating circuits including the compensating coil of its respective regulator, a lamp having a positive temperature coefficient of resistance, and a predetermined portion of a resistor across which is applied a voltage the magnitude of which is proportional to the magnitude of the voltage across its associated separate bus, the compensating circuits being connected in parallel circuit relationship with one another with the polarity of the voltages across said predetermined portions of the resistors in opposition to one another, so that each of the compensating coils can effect a correcting action with respect to its regulator, to thus maintain the predetermined relationship between the magnitudes of the voltages across the three separate buses.

No references cited.